(12) United States Patent
Puta

(10) Patent No.: US 11,255,308 B2
(45) Date of Patent: Feb. 22, 2022

(54) WIND TOWER

(71) Applicant: Vaclav Puta, Kyneton (AU)

(72) Inventor: Vaclav Puta, Kyneton (AU)

( * ) Notice: Subject to any disclaimer, the term of this patent is extended or adjusted under 35 U.S.C. 154(b) by 0 days.

(21) Appl. No.: 16/086,545

(22) PCT Filed: Mar. 8, 2017

(86) PCT No.: PCT/AU2017/050201
§ 371 (c)(1),
(2) Date: Sep. 19, 2018

(87) PCT Pub. No.: WO2017/161412
PCT Pub. Date: Sep. 28, 2017

(65) Prior Publication Data
US 2019/0101098 A1    Apr. 4, 2019

(30) Foreign Application Priority Data

Mar. 21, 2016   (AU) ............................... 2016901049

(51) Int. Cl.
*F03D 1/04*         (2006.01)
*F03D 9/35*         (2016.01)
(Continued)

(52) U.S. Cl.
CPC ............... *F03D 1/04* (2013.01); *F03D 9/35* (2016.05); *F03D 13/22* (2016.05); *F03D 9/25* (2016.05);
(Continued)

(58) Field of Classification Search
CPC ..... F03D 1/04; F03D 9/25; F03D 9/35; F03D 13/22; F05B 2240/13; F05B 2240/131;
(Continued)

(56) References Cited

U.S. PATENT DOCUMENTS

| 299,127 A | 5/1884 | Garrigus |
| 2,616,506 A | 11/1952 | Mathias |

(Continued)

FOREIGN PATENT DOCUMENTS

| CN | 1456805 A | 11/2003 |
| CN | 101749179 A | 6/2010 |

(Continued)

OTHER PUBLICATIONS

First Office Action dated Oct. 31, 2019 (three pages) from corresponding Chinese Patent Application CN 2017800190262.

(Continued)

*Primary Examiner* — Woody A Lee, Jr.
*Assistant Examiner* — Behnoush Haghighian
(74) *Attorney, Agent, or Firm* — Crowell & Moring LLP; John C. Freeman

(57) ABSTRACT

The present invention relates to a wind tower (10) for delivering wind flow to a turbine. The wind tower (10) including includes a support structure (12) mounted to a support surface (14) and a wind intake section 16 rotatably mounted to the support structure (12) and elevated with respect to the support surface (14). The intake section (16) includes a plurality of internal passageways (32) extending between a plurality of wind-facing inlets (22) and a plurality of outlets (34). The plurality of inlets (22) are orientated for concurrently receiving an oncoming wind-flow W. Each of the inlets (22) are in fluid communication with one of the outlets 34 via one of the passageways (32). The wind tower (10) further includes an output passageway (42) for collecting wind flow W from the plurality of outlets (34). The output passageway (42) is in fluid communication with the outlets (34) and extends downwardly from the intake section (16) toward the support surface (14) for delivering wind (Continued)

flow W to a turbine located at or proximate to the support surface (14).

12 Claims, 6 Drawing Sheets

(51) Int. Cl.
  *F03D 13/20* (2016.01)
  *F03D 9/25* (2016.01)
(52) U.S. Cl.
  CPC ... *F05B 2240/131* (2013.01); *F05B 2240/133* (2013.01); *Y02E 10/728* (2013.01)
(58) Field of Classification Search
  CPC ..... F05B 2240/133; F24F 13/081; F24F 7/02; F24F 7/024; F23L 17/02–16; F23L 2700/001–002
  See application file for complete search history.

(56) References Cited

U.S. PATENT DOCUMENTS

| | | | | |
|---|---|---|---|---|
| 4,116,581 A * | 9/1978 | Bolie | ........................ | F03D 1/04 |
| | | | | 415/4.4 |
| 4,154,556 A * | 5/1979 | Webster | ..................... | F03D 1/04 |
| | | | | 415/4.4 |
| 4,508,973 A * | 4/1985 | Payne | ........................ | F03D 1/04 |
| | | | | 290/55 |
| 4,935,639 A * | 6/1990 | Yeh | ........................ | F24S 70/65 |
| | | | | 290/55 |
| 6,952,058 B2 * | 10/2005 | McCoin | ................... | F03D 1/025 |
| | | | | 290/44 |
| 7,400,057 B2 * | 7/2008 | Sureshan | ................... | F03D 9/25 |
| | | | | 290/55 |
| 7,488,150 B2 * | 2/2009 | Krippene | ................... | F03D 1/04 |
| | | | | 415/4.2 |
| 7,753,644 B2 * | 7/2010 | Krippene | .............. | F03D 3/0454 |
| | | | | 415/4.2 |
| 7,811,048 B2 | 10/2010 | Allaei | | |
| 8,403,623 B2 * | 3/2013 | Krippene | .............. | F03D 3/0481 |
| | | | | 415/4.2 |
| 8,459,930 B2 * | 6/2013 | Krippene | ................... | F03D 1/04 |
| | | | | 415/4.2 |
| 8,564,154 B2 * | 10/2013 | Bahari | .................... | F03D 9/007 |
| | | | | 290/55 |
| 9,273,665 B1 * | 3/2016 | Krippene | ................ | F03D 3/005 |
| 9,291,148 B2 * | 3/2016 | Allaei | ........................ | F03D 1/06 |
| 9,294,013 B2 * | 3/2016 | Allaei | .................... | F03D 1/025 |
| 9,453,494 B2 * | 9/2016 | Krippene | .............. | F03D 3/0409 |
| 10,280,900 B1 * | 5/2019 | Krippene | ................. | F03D 9/25 |
| 2004/0247438 A1 * | 12/2004 | McCoin | .................. | F03D 13/22 |
| | | | | 416/132 B |
| 2009/0155043 A1 | 6/2009 | Krippene | | |
| 2010/0001532 A1 * | 1/2010 | Grumazescu | ............. | F03D 9/25 |
| | | | | 290/55 |
| 2010/0084867 A1 | 4/2010 | Sato | | |
| 2011/0136279 A1 | 6/2011 | Rho | | |
| 2012/0301282 A1 | 11/2012 | Kim | | |
| 2013/0001951 A1 | 1/2013 | Tai et al. | | |
| 2013/0136574 A1 | 5/2013 | Allaei | | |
| 2015/0152849 A1 * | 6/2015 | Allaei | ..................... | F03D 9/255 |
| | | | | 290/55 |
| 2016/0186718 A1 * | 6/2016 | Allaei | ....................... | F03D 1/04 |
| | | | | 415/80 |
| 2016/0186726 A1 * | 6/2016 | Allaei | ..................... | F03D 80/80 |
| | | | | 415/80 |
| 2016/0186727 A1 * | 6/2016 | Allaei | ....................... | F03D 1/02 |
| | | | | 415/80 |

FOREIGN PATENT DOCUMENTS

| | | |
|---|---|---|
| CN | 201599146 U | 10/2010 |
| CN | 103956964 A | 7/2014 |
| DE | 10 2012 010 576 A1 | 11/2013 |

OTHER PUBLICATIONS

International Search Report dated Mar. 20, 2017 (4 pages) from PCT Priority Application No. PCT/AU2017/050201.
International Preliminary Report on Patentability dated Jun. 14, 2017 (22 pages) from PCT Priority Application No. PCT/AU2017/050201.
Extended European Search Report (7 pages) dated Feb. 27, 2019 from corresponding European Application No. EP 17769181.3.
Office Action dated Jul. 29, 2021 from corresponding Japanese Patent Application No. 2018-549357 (Four pages).

* cited by examiner

WIND TOWER

CROSS-REFERENCE

This application is a National Stage application of International Application No. PCT/AU2017/050201, filed Mar. 8, 2017, the entire contents of which are incorporated herein by reference.

The present application claims priority from Australian provisional patent application No. 2016901049 filed on 21 Mar. 2016, the disclosure of which should be understood to be incorporated into this specification.

TECHNICAL FIELD

The present invention relates to a wind tower for receiving and directing wind flow toward a turbine. The present invention is particularly applicable for receiving wind flow from relatively high altitudes and directing the wind flow to a ground-based turbine associated with an electric generator. However, it is to be appreciated that the invention is not limited to this application and could be used in any wind-based energy system to deliver wind energy to a turbine.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Conventional rotor-type wind turbines have been the focus of considerable research and investment as a result of the continued push toward improved renewal energy systems. Improvements in wind turbine efficiency have resulted in most developed countries supplementing their energy supplies with wind power and certain countries producing a substantial portion (up to 40%) of their energy requirements from wind energy.

Notwithstanding their relatively popular uptake, rotor-based wind turbines involve a number of inherent technical limitations. Firstly, rotors and generator equipment are necessarily located atop large towers, in some instances over 100 m above the ground, resulting in high installation, maintenance and repair costs. This necessitates a compromise between the desire for taller wind turbines with access to higher prevailing winds and, on the other hand, the desire to limit ongoing maintenance and repair costs which are directly proportionate to turbine height. Secondly, rotor blades having desirably long length and light weight must also be sufficiently strong in order to withstand large wind forces. These operational demands require costly materials which contribute to high capital cost. Rotor-based wind turbines also present a number of environmental shortfalls, for example, excessive noise and the hazard they present to birds flying in the proximity of the rotors.

In view of the above challenges with rotor-based wind turbines, an alternative wind-power system has been developed, known as 'wind towers'. Wind towers involve wind being received through a wind intake positioned at an altitude above the ground, the wind then being directed or funnelled to a ground-based generator system. Wind towers allow for convenient access to the ground-based generator thus reducing installation, repair and maintenance costs. Moreover, wind towers do not typically include rotor blades therefore reducing noise and eliminating the hazard to wildlife.

An existing wind tower system is disclosed in U.S. Pat. No. 299,127 which includes an elevated air intake connected via a vertical passageway to a ground-based turbine. The elevated intake is pivotally mounted and includes a vane for directing the intake opening towards oncoming wind. A similar wind tower system is disclosed in U.S. Pat. No. 2,616,506 which includes a tapered air-intake scoop connected to a tapered air-outlet spout via a restricted throat structure. A wind-driven turbine is positioned within said throat for generating rotational energy.

Another existing wind tower system is disclosed in U.S. Pat. No. 7,811,048. The wind tower includes an elevated intake in fluid communication with a ground-based outlet. A turbine is located adjacent to the outlet and is used to power a generator. The intake includes an adjustable nozzle assembly allowing adjustment of the diameter of an intake nozzle in response to changes in wind conditions.

In view of ever increasing energy demands, it is desirable to provide an alternative wind tower design which improves upon at least some aspects of existing wind tower systems.

SUMMARY OF INVENTION

According to the present invention there is provided a wind tower for delivering wind flow to a turbine including: a support structure rigidly mounted to a support surface; a wind intake section rotatably mounted to the support structure and elevated with respect to the support surface, the intake section having a plurality of internal passageways separated by a plurality of internal partitions and extending between a plurality of wind-facing inlets and a plurality of outlets, each of the inlets being in fluid communication with one of the outlets via one of the passageways wherein all of the inlets in the intake section are orientated for concurrently receiving an oncoming wind-flow; and an output passageway for collecting wind flow from the plurality of outlets, the output passageway being in fluid communication with the outlets and extending downwardly from the intake section toward the support surface for delivering wind flow to a turbine located at or proximate to the support surface.

The present invention advantageously provides a wind tower having an improved intake design which streamlines incoming wind flow and improves overall efficiency. In particular, the intake section of the present invention is provided with discrete passageways which facilitate airflow streamlining through the intake section. The provision of discrete passageways enables the placement of the inlets and outlets to be optimised according to the desired path of the incoming wind flow.

The plurality of inlets is wind-facing such that all inlets are faced toward the oncoming wind. That is, the plurality of inlets are orientated for concurrently receiving an oncoming wind-flow. For example, the plurality of wind-facing inlets can be oriented in the same direction for receiving an oncoming wind flow. This present an advantage over existing wind towers which have a plurality of intakes radially directed outward such that, at any time, at least some of the intakes are redundant. Advantageously, the present invention allows for the utilisation of all inlets whenever wind flow is present.

Furthermore, the improvements in efficiency provided by the present invention may, in some instances, economically justify the construction of a much taller wind tower having access to higher prevailing winds. Whereas the increased capital expenditure to construct a significantly taller wind tower is not warranted using existing wind tower designs, the present invention is expected to yield far greater power return than existing designs and, to this extent, may rationalise much larger investments in renewable energy infrastructure.

In a particular form of the invention, at least some of the passageways are non-linear thereby advantageously allowing for wind flow to be captured from a wider range of inlets than would otherwise be available using linear passageways. Conventional wind towers, for example the turbine-intake tower in U.S. Pat. No. 7,811,048 necessarily locate an output downpipe directly downstream of the intake nozzle. Advantageously, the provision of non-linear passageways in the present invention allows for wind to be captured from regions other than directly upstream of the output passage. For example, non-linear passageways allow for an inlet to be disposed laterally adjacent or even downstream of output passage and then for wind flow to be re-directed via a curved passageway toward the output passage. In this regard, the present invention allows for capture of larger volume of wind than would otherwise be possible. Advantageously, the provision of discrete non-linear passageways facilitates the construction of an intake section which is therefore wider than would otherwise be feasible with a conventional inlet.

In alternative forms of the invention, each of the passageways may be linear. The provision of a plurality of discrete passageways between respective inlets and outlets still represents an improvement over prior art systems in which single, larger, intakes are utilised. It will be appreciated that inlets disposed directly upstream of the output passage may be connected to the output passage via linear passageways whereas inlets disposed in positions other than upstream of the output passage may advantageously utilise non-linear passages to re-direct wind flow from its original vector toward the output passage, as desired. In some forms of the invention, the passageways may be adjacent to one another. In other forms of the invention the passageways may be spaced apart from adjacent passageways by some margin.

In a particular form of the invention, the intake section includes a central aperture in fluid communication with the output passageway and the plurality of outlets is distributed around the periphery of the central aperture. In this form of the invention, the utilisation of non-linear passageways advantageously facilitates the passage of wind flow to the peripheral distribution of outlets. It will be appreciated that a peripheral distribution of outlets around the central aperture is advantageous in that the wind flow received through the intake section is evenly distributed to the output passageway thereby reducing flow constriction which can lead to flow resistance that can propagate upstream and reduce wind tower efficiency. In a particular embodiment of the invention, the central aperture is circular and the plurality of outlets is distributed circumferentially around the central aperture.

In some forms of the invention, the intake section may include a plurality of partitions extending between the inlets and outlets, the plurality of partitions defining the plurality of passageways therebetween. In this regard, each of the passageways may be separated only by a relatively thin partition thereby maximising the amount of volume occupied by passageways in the intake section. The 'width' of a passageway may be defined as the distance between adjacent partitions. In some forms of the invention, the intake section may include fewer passageways of greater width and in alternative forms of the invention the intake section may include a greater number of passageways of narrower width.

In some forms of the invention, the plurality of partitions are also load-bearing and therefore the partition thickness (and therefore the spacing of the passageways therebetween) may be a function of the load that the particular partition is designed to bear. In forms of the invention where the wind tower includes multiple levels of intake sections, the width of the passageways may vary across the levels in accordance with changes in load-bearing requirements.

The intake section may include a wind-facing intake face on which the inlets are disposed and an outlet face on which the outlets are disposed, the plurality of partitions extending between the intake and outlet faces. In certain forms of the invention, the intake face may be planar and define a two-dimensional shape such as a square or a rectangle. In alternative forms of the invention the intake face may be curvilinear. In a particular form of the invention, the intake face may be shaped as a saddle or may be sinusoidal. Advantageously, a curvilinear intake face may provide a more streamlined intake area which minimises upstream flow disruption and maximises intake efficiency. In forms of the invention in which the intake section is provided with a circular central aperture, the above-note outlet face may be annular and defined by the central aperture.

The inlets and outlets may be equidistant from the support surface such that the passageways are generally horizontal. In other forms of the invention, the passageways may be inclined with respect to horizontal.

The rotatable mounting of the intake section permits 'yaw' rotation i.e. rotation about a generally upright axis in order for the intake section to rotate according to wind direction. The intake section may include a vane member for actuating rotation of the intake section to orientate the inlets toward oncoming inflow. Advantageously, the rotatably mounted intake section may therefore be maintained in a wind-facing orientation to maximise wind intake irrespective of changing wind direction. In certain forms of the invention, the vane member may be defined by a tail portion of the intake section. The tail portion may extend outwardly from the intake section on the opposite side of the intake section from the intake face. In this regard, the tail portion will be orientated in the direction of wind flow thereby positioning the intake face toward the oncoming flow. Moreover, the tail portion may contribute to the overall aerodynamic profile of the intake section thereby reducing aerodynamic forces applied to the wind tower and subsequently reducing demands on the mechanical strength of the wind tower. In some forms of the invention, the aerodynamic centre of the intake section may be positioned behind (i.e. downstream of) the axis of rotation such that rotation of the intake section is actuated by the wind travelling through the intake section. Accordingly, in some embodiments of the invention, the intake section may automatically maintain itself in a wind-facing orientation without the use of a separate vane member or tail portion.

The support structure can, in some embodiments define an upright column. In a particular embodiment of the invention, the support structure may define a passageway therethrough facilitating maintenance access to the intake section. In certain forms of the invention, the access passageway may extend to the top of the wind tower to facilitate access thereto.

The wind tower of the present invention may include a downpipe which defines the output passageway. In this regard, a downpipe may be provided which is generally vertical and carries wind flow to the support surface. In alternative forms of the invention, a plurality of downpipes may collectively define a plurality of output passageways. In some embodiments of this form of the invention, each outlet may be associated with a respective downpipe. In other alternative embodiments, each outlet may be serviced by (i.e. deliver wind to) a number of downpipes. The downpipes may extend through the support structure or, alternatively, be external to the support structure. In some forms of the invention, the support structure and the output passageway are defined by a single downpipe.

In particular forms of the invention, the wind tower includes a plurality of wind intake sections. The arrangement of the intake sections may vary depending upon the size and particular wind tower design. In a particular form of the invention the plurality of intake sections have a stacked configuration such that each intake section is located at a level or tier above or below an adjacent intake section. Each intake section in the 'stack' of intake sections may be rotatably mounted to the support structure or, alternatively, to the adjacent intake sections. Advantageously, the provision of a plurality of intake sections increases the overall wind-facing area of the wind tower therefore increasing the wind intake. Moreover, the provision of discrete wind intake sections which are individually rotatable allows for optimum wind intake in instances where wind direction can vary relative to altitude. In this regard, the wind intake sections at the upper tiers of the wind tower may face oncoming wind having a different direction to the wind which is faced by and received through the intake sections on the lower tiers of the wind tower.

The provision of a plurality of wind intake sections is also advantageous in that wind tower size can be conveniently tailored to suit a particular geographic location or other infrastructure requirements. In this regard, the present invention allows for a larger wind tower to be constructed simply by installing additional intake sections stacked upon existing intake sections. The invention may therefore allow a wind tower to be constructed and preliminarily operated with an initial number of wind intake sections and to be subsequently augmented with additional intake sections constructed above the original intake sections. This aspect of the present invention advantageously facilitates customisation not previously available with existing wind towers.

The size of the inlets may vary in accordance with the size of the wind tower. However, it will be appreciated that a degree of wind energy is absorbed by skin friction against the partitions and therefore an increase in inlet size will reduce the proportionate amount of energy which is lost to skin friction.

According to a particular example, a relatively small wind tower according to the present invention may include three intake sections, each intake section having thirty inlets. The size of the ninety total inlets may range from 3 cm wide and 30 cm high (an area of 0.009 $m^2$ per inlet providing a total wind facing area of 0.27 $m^2$ per intake section) to 10 cm wide and 100 cm high (an area of 0.1 $m^2$ per inlet providing a total wind facing area of 3 $m^2$ per intake section). Whilst larger inlets are generally desirable for reduced skin friction, proportionate to intake, smaller intakes will sometimes be preferable depending on size limitations of a particular wind tower. According to an alternative example, a larger wind tower according to the present invention may include inlets of 30 m width and 30 m height (an area of 900 $m^2$ per inlet). An increase in inlet height is, however limited, by structural considerations and therefore larger inlets may require thicker partitions to support the inlet (and the mass of the intake sections in higher levels). An estimated maximum inlet height using aluminium material is 30 m however it will be appreciated that larger inlet sizes may be achievable if intake sections were constructed with alternative and more expensive, materials such as titanium, carbon composites etc.

It will be appreciated that intake sections configured in a 'stacked' arrangement will inherently include a 'lowermost' intake section and an 'uppermost' intake section and references herein to these terms will be understood accordingly.

As noted above, in some forms of the invention the intake sections are rotatable with respect to each other and independently rotatable with respect to the support structure. In alternative forms of the invention, the intake sections may be rigidly connected to one another and mutually rotatable with respect to the support structure. This form of the invention may be suitable for wind towers which are not expected to encounter differing wind orientations across the height of the wind catching area.

In embodiments of the invention having a plurality of intake sections, a plurality of downpipes may be provided for collecting wind from the plurality of intake sections, each downpipe extending between an associated wind intake section and the support surface. In some forms of the invention, each intake section is serviced by a single downpipe. In alternative forms of the invention, each intake section is serviced by a plurality of downpipes. In a particular embodiment of the invention, a first downpipe associated with a first intake section extends downwardly to a second intake section located below the first intake section, the first downpipe being in fluid communication with, and delivering wind to, a second downpipe associated with the second intake section such that, in use, the second downpipe receives wind flow from the first and second intake sections. Advantageously, this arrangement allows for the output of the higher intake section to be channelled to the downpipe of the lower intake section. In this regard, the output of the higher intake section will supplement the output of the lower intake section and their combined outputs will be delivered downward through the downpipe of the second intake section. It will be appreciated that this arrangement is not limited to merely two intake sections and can be extended to any number of intake sections. In a particular form of the invention a downpipe of a lowermost intake section in the plurality of intake sections receives wind flow from each of the other intake sections in the plurality of intake sections.

In some forms of the invention, each of the intake sections have uniform dimensions. In alternative forms of the invention, the plurality of intake sections is arranged in a stacked configuration and the plurality of intake sections have non-uniform dimensions, each intake section above the lowermost intake section being smaller than the intake section immediately below. In this form of the invention each successive intake section may be reduced in size so as to provide a pyramid formation. In this formation, the largest intake section is the lowermost intake section and the smallest intake section is the uppermost intake section. Advantageously, this form of the invention may be preferable for structural engineering reasons due to the reduction in intake section mass as the levels of the wind tower increase. In alternative forms of the invention, each of the intake sections may be equal size i.e. having uniform dimensions.

It will be appreciated that a wind tower according to the present invention may be installed on a variety of support surfaces, similar to existing wind turbines. The support surface may be a ground surface. By way of example, the support surface may be a land-based surface such as a paddock or vacant farm-land. Alternatively, the support surface may be a floating platform to allow for the wind-tower to function in a sea or ocean. In another alternative, the support surface may be a surface of a vehicle. In a particular example, the vehicle may be a ship. In this example, the wind tower mounted thereto may deliver wind to a turbine which is capable of propelling the ship through the water.

The support structure of the present invention may be formed by a variety of alternative structures. In some forms of the invention, the support structure may consist of an elongated support member such as a support pole, extending upwardly from the support surface. In this instant, the intake section(s) may be rotatably mounted to the support pole and elevated above the support surfaces by virtue of the height of the support pole. In alternative forms of the invention, in which a number of stacked intake sections are included, the lowermost intake section may be rigidly or rotatably mounted to the ground and an upper intake section be rotatably connected to the lowermost intake section. In this instance, the lowermost intake section may define the support structure for the upper intake section. This form of the invention may be particularly suitable where installation of the wind tower is taking place in areas of relatively high average wind velocity at ground level, for example hilltops, or mountains or any other windy area. In still further forms of the invention, the support structure may consist of a base structure such, for example a metal framework, which is neither an intake section nor a support pole perse.

As noted in the foregoing, the output passageway may be defined by one or more downpipes which extend from the outlets of a respective intake section to the support surface. In instances where the support structure is defined by an elongated hollow support pole, the downpipes may extend through the central passageway defined by the support pole. The downpipes of the present invention may be tubular, square, flexible or rigid or have any other dimensions which permit fluid passage therethrough.

The present invention provides improved wind delivery to a turbine located adjacent to the support surface. It will be appreciated that a turbine associated with the present invention may be installed on the support surface or, alternatively, may be beneath the support surface or above the support surface. In any instance, the turbine will generally be located 'adjacent' to the support surface so as to permit convenient installation and maintenance which is not possible with conventional rotor-type wind turbines in which the turbine is located high above the ground. The type of turbine suitable for use with the present invention will be generally known to persons skilled in the art and may be associated with a suitable electric generator for converting rotational energy extracted from the wind flow by the turbine to electric energy.

As noted in the foregoing, the improvements in efficiency provided by the present invention may, in some instances, economically justify the construction of a much taller wind tower having access to higher prevailing winds. Whereas the increased capital expenditure to construct a significantly taller wind tower is not warranted using existing wind tower designs, the present invention is expected to yield far greater power return than existing designs and, to this extent, may rationalise much larger investments in renewable energy infrastructure. The construction of larger wind towers is also advantageous in that larger wind towers justify the use of larger electricity generators which are typically more efficient than smaller generators.

The present invention may, in some embodiments, comprise a tall and high output wind towers which can be connected to an existing power grid or to other large wind towers in separate geographic locations. In contrast, smaller wind towers are generally adapted for a much lower output and therefore would not normally justify the capital expenditure involved in a large-scale wind-tower electrical connection system.

BRIEF DESCRIPTION OF DRAWINGS

In order that the invention may be more fully understood, some embodiments will now be described with reference to the figures in which.

DETAILED DESCRIPTION

Figure 1:
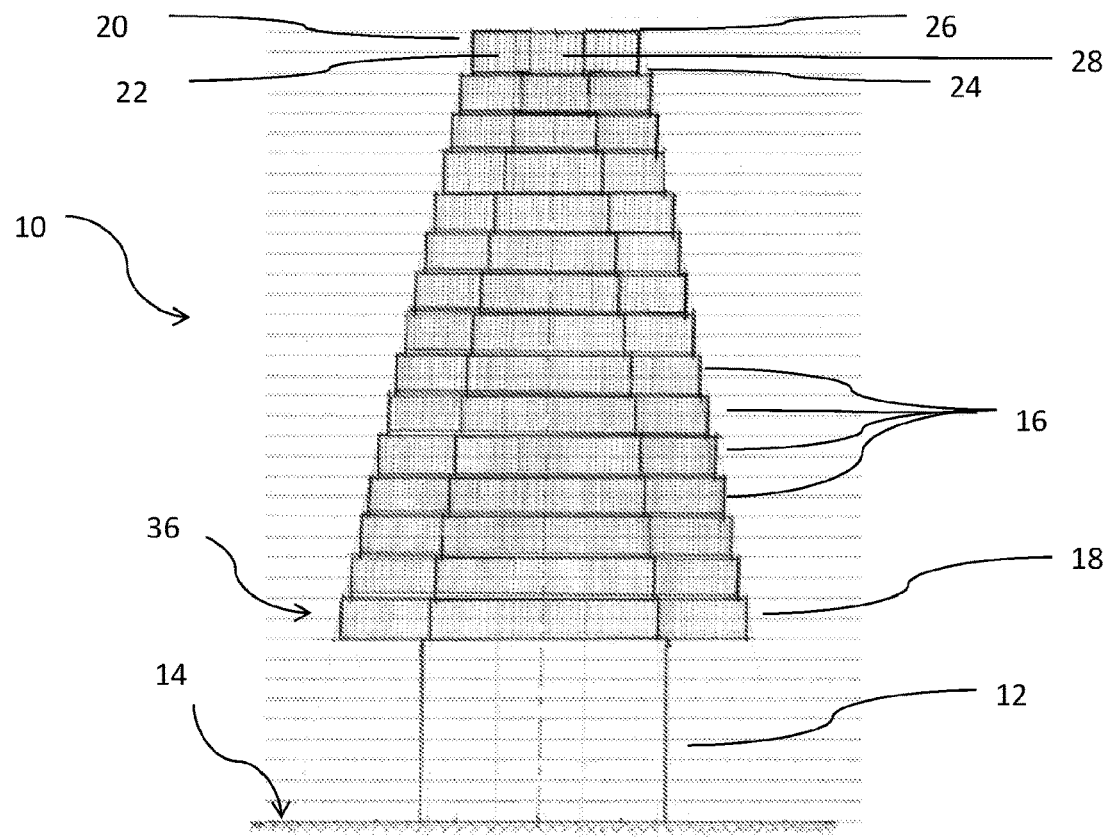
FIG. 1 is a frontal view of a wind tower according to a first embodiment of the present invention and including a plurality of intake sections.

FIG. 1 illustrates a wind tower 10 according to a first embodiment of the present invention. Wind tower 10 includes a support structure comprising a base 12 which is mounted to a support surface comprising a ground surface 14. Wind tower 10 includes fifteen wind intake sections 16 arranged in a 'stacked' formation, each intake section 16 defining a separate tier in the wind tower 10. The fifteen intake sections 16 are non-uniformly sized with a lowermost intake section 18 having the greatest width and the remaining intake sections 16 sequentially decreasing in size so as to form a pyramid-shaped structure.

Lowermost intake section 18 is rotatably mounted to the base 12 with each subsequent intake section 16 in the 'stack' being rotatably mounted via a bearing arrangement (not shown) to the underlying intake section. In this regard lowermost intake section 18 is directly connected to the base 12 whilst each additional intake section 16 is rotatable mounted with respect to the base 12 but not connected directly thereto. In this regard, each intake section 16 is permitted independent rotational movement about a vertical axis. This arrangement allows each intake section 16 to rotate to face oncoming wind and, advantageously, changes in wind direction across the height of wind tower 10 are accommodated with higher intake sections 16 able to be orientated differently from lower intake sections 16.

Each intake section 16 includes a plurality of inlets 22 observable from the frontal perspective illustrated in FIG. 1. Each inlet 22 is divided by a partition wall which will be discussed in further detail below with reference to FIG. 2. Inlets 22 are rectangular in shape and extend between lower wall 24 and an upper wall 26 of each intake section 16. Each intake section 16 also includes a central aperture 28 extending between the upper and lower walls 26, 24. For the purposes of clarity, the inlets 22, upper and lower walls 26, 24 and the central aperture 28 are labelled only with respect to the uppermost intake section 20 however it will be appreciated that each of the intake sections 16 include these features.

It will be appreciated that average wind velocity generally increases with altitude. For this reason, wind towers total height typically represents a compromise between greater height providing access to greater power-generating potential and, on the other hand, the increased capital expenditure associated with a taller structure. In this regard, the maximum height of wind tower 10 may vary depending on the natural wind patterns of the intended location for the wind tower as well as the amount of capital available for the project. The illustrated embodiment of wind tower 10 includes intake sections 16 having a height of 30 metres such that the total height of all fifteen intake sections is 450 metres. In the illustrated embodiment, the height of base 12 is 140 metres such that the total height of wind tower 10 is 590 metres. It will be appreciated that the maximum height of a wind tower according to the present invention is limited only by the structural parameters of the tower and the strength-to-weight ratio of the construction materials.

Figure 2:
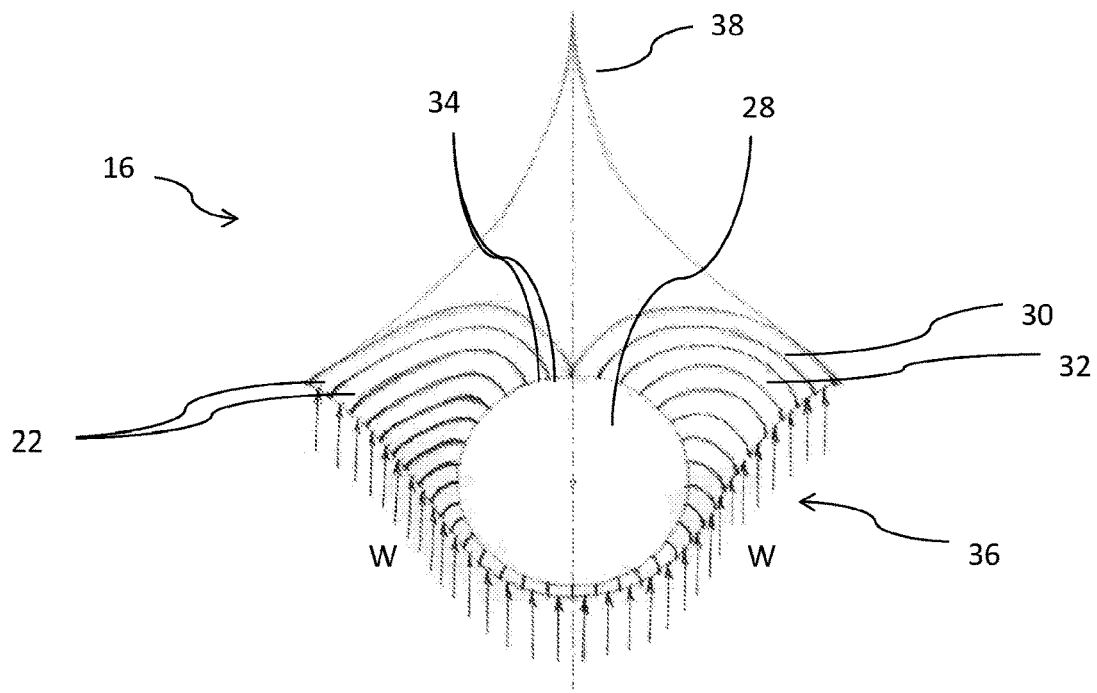
FIG. 2 is a top cross-sectional view of an intake section as illustrated in FIG. 1.

Turning now to FIG. 2, there is illustrated a top sectional view of an intake section 16. In this view, upper wall 26 is not shown in order to reveal a plurality of internal partitions 30 which, therebetween, define a plurality of internal passageways 32 extending between the inlets 22 and a plurality of associated outlets 34. Each of the inlets 22 is in fluid communication with a respective outlet 34 via one of the passageways 32 and facilitates an oncoming wind flow W to be received within an inlet 22, transferred through a passageway 32 and delivered to an outlet 34. Each outlet 34 is circumferentially distributed around the central aperture 28 which extends through the intake section 16. In this regard, wind flow received across the width of the intake section 16 is evenly distributed around the central aperture 28. Moreover, it will be appreciated that the passageways at the wind-facing edge or front of the intake section 16 are generally linear while the outer of passageway 32 are curved so as to redirect wind flow to the downstream side of the central aperture 28. It will be noted that the total width of intake section 16 is greater than the diameter of the central aperture 28. In this regard, the discrete non-linear passageways of the present invention allow wind flow to be captured across a wider area and redirected toward an output passageway within the central aperture 28. The output passageway may be defined by the central aperture 28. In alternative embodiments of the invention, the output passageway may be defined by a separate conduit located within aperture 28. In particular embodiments of the invention, the output passageway may be collectively defined by a plurality of central apertures in a plurality of intake sections stacked upon one another.

Each intake section 16 includes an intake face 36 which is collectively defined by the plurality of inlets 22. When viewed from the front perspective of FIG. 1, each intake face 36 is rectangular. When viewed from the top perspective of FIG. 2, intake face 36 is curvilinear and generally sinusoidal. At the opposite end of the passageways 32, the plurality of outlets 34 defined an annular outlet face which corresponds with the periphery of the central aperture 28.

Each intake section 16 includes a vane member comprising a tail portion 38 which extends from the intake section 16 rearwardly and from the opposite side of the intake section from the intake face 36. When subjected to wind flow, tail portions 38 operate to actuate rotation of the respective intake section 16 in order to orientate the intake face 36 in a wind-facing direction. In this regard, each intake section 16 in wind tower 10 is capable of automatic orientation adjustment in response to changes in wind direction so as to achieve maximum wind flow through each intake face 36. Moreover, the aerodynamic centre of intake section 16 is located behind (i.e. downstream) the centre of rotation such that wind flow travelling through the intake section contribute to the rotation of the intake section and assist in orientating the intake section in a wind-facing direction.

As illustrated in FIG. 2, passageways 32 are non-linear and facilitate streamlined flow through each intake section 16. Each inlet 22 functions as a 'mouth' receiving a portion of the oncoming wind flow which is directed by the respective passageway 32 to the respective outlet 34. Advantageously, the plurality of partitions 30 promotes streamlined wind flow through the intake section toward the central aperture.

Figures 3, 4:
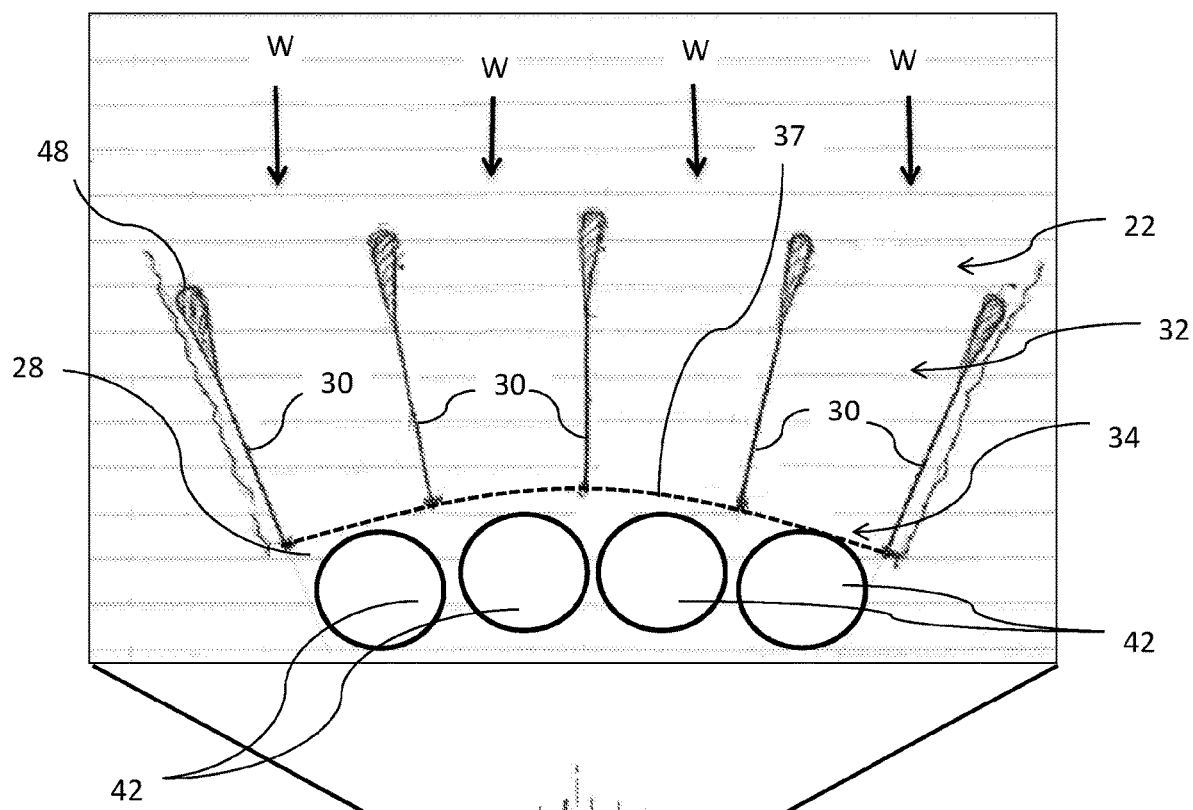
FIG. 3 is a close top perspective on a front section of the intake section illustrated in FIG. 4.
FIG. 4 is a top perspective of the intake section illustrated in FIG. 2 and illustrates a first embodiment of a downpipe arrangement.

FIG. 3 illustrates a closer perspective of the front portion of the intake section 16. The wind-facing edge of partitions 30 include a rounded leading edge 48 which tapers toward the width of the partitions 30 in order to improve streamlining of incoming wind flow through inlets 22. Partitions 30 terminate at the circumference of the central aperture 28 at which outlets 34 are located, outlets 34 collectively defining an annular outlet face 37 denoted by the dashed line in FIG. 3. Adjacent to each of the outlets 34 is a respective downpipe 42. With reference to FIG. 4, it will be appreciated that downpipes 42 have a circular arrangement and occupy the periphery of the central aperture 28 whilst the central portion of central aperture 28 remains unoccupied. As illustrated in FIG. 1, intake sections 16 and the central regions 28 reduce in size in with each additional intake section tier. In this regard, the unoccupied region of central aperture 28 shown in FIG. 4 may be occupied by the downpipes from the intake sections in upper tiers of the wind tower 10. Therefore, the downpipes associated with an intake section immediately above the intake section illustrated FIG. 4 may define a concentric circular arrangement having slightly lesser radius than, and disposed immediately inward of, the circular arrangement defined by the downpipes 42 in FIG. 4.

To enable fluid communication between the rotating internal passageways 32 with the stationary downpipes 42, the intake of each downpipe 42 may be configured with a rectangular opening (not shown) positioned adjacent to (and having approximately the same size as) the outlets 34. In some embodiments of the invention, the number of downpipes 42 may be less than the number of outlets 34. In this instance, the width of the rectangular opening of the downpipes 42 may be correspondingly larger than the outlet 34 to accommodate wind flow from two or more outlets 34.

Figure 5:
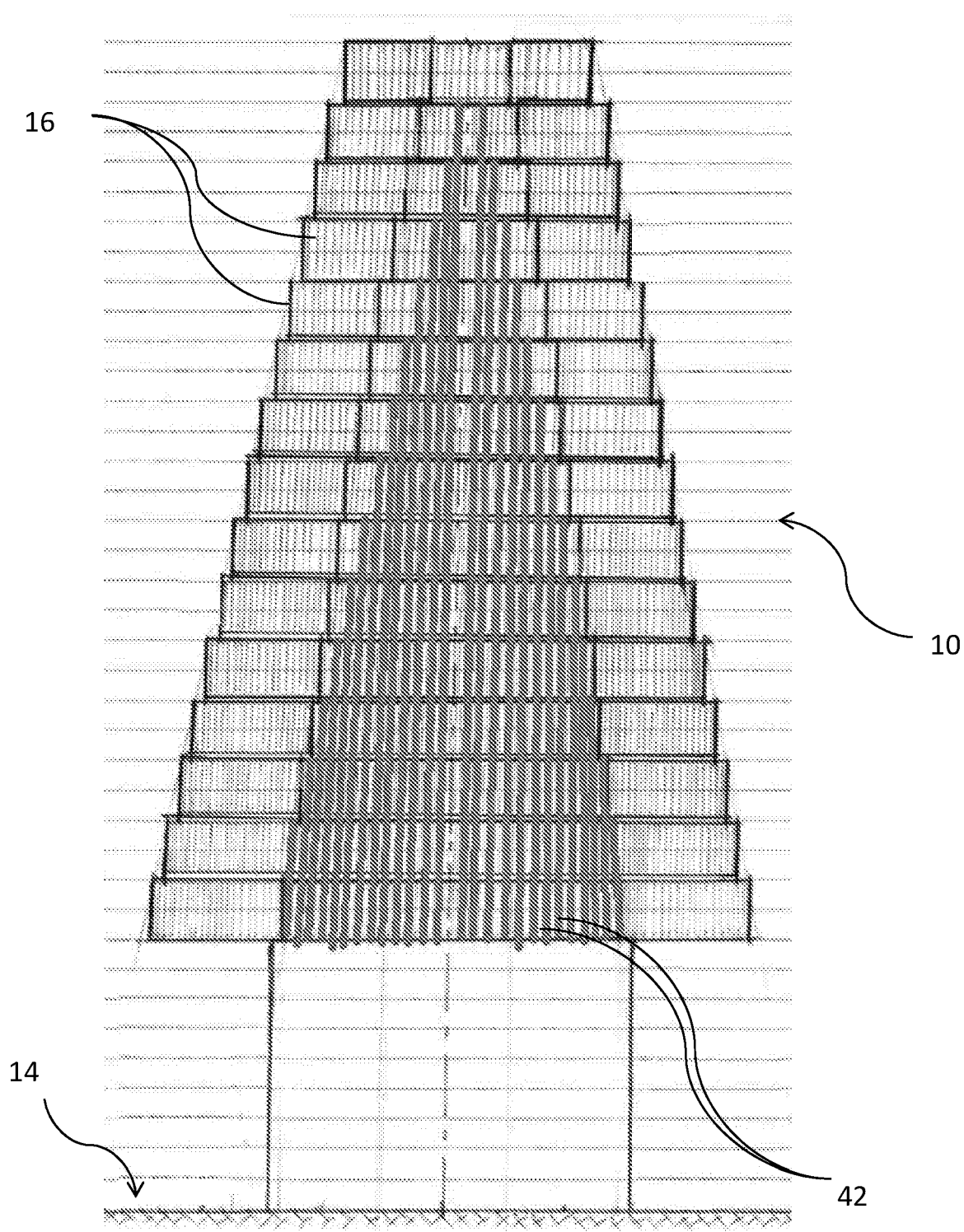
FIG. 5 is a front perspective of the downpipe arrangement illustrated in FIG. 4.

A side profile of this arrangement is partially shown in FIG. 5 in which a pair of downpipes 42 is illustrated extending downwardly from each intake section 16. For illustrative purposes, FIG. 5 shows only a pair of downpipes and only the downpipes on opposite sides of the central apertures 28. However it will be appreciated that each intake section 16, in fact has a downpipe 42 extending from each outlet 34. This downpipe arrangement permits wind flow from each outlet of each intake section to be delivered toward a turbine intake (not shown) located adjacent to the ground 14.

Figure 6:
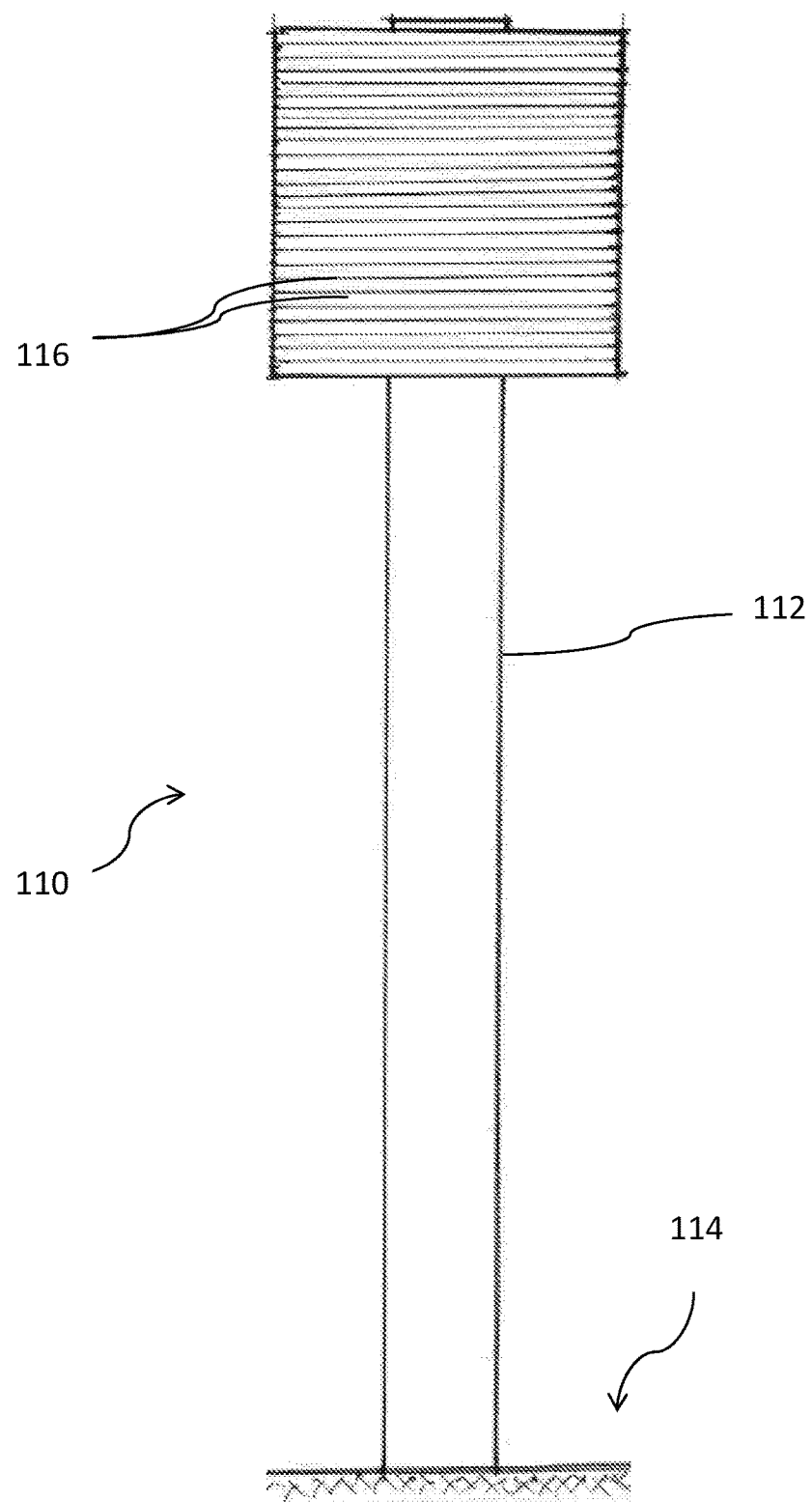
FIG. 6 is a front perspective of a wind tower according to a second embodiment of the present invention.

Turning now to FIG. 6 there is illustrated a wind tower 110 according to a second embodiment of the present invention. Wind tower 110 includes twenty-six intake sections 116 arranged in a stacked or tiered configuration. In contrast to the independently rotatable intake sections of the first embodiment of the present invention, intake sections 116 are rigidly connected to each other so as to be mutually rotatable with respect to the support structure which, in this second embodiment, is comprised by an upright support column 112 extending from a ground surface 114.

Each of intake sections 116 are otherwise equivalent to the intake sections 16 of the first embodiment. That is, intake sections 116 include a tail portion, a plurality of inlets, passageways and outlets (not shown) for delivering wind to a central aperture. A downpipe arrangement (not shown) extends downwardly from the intake sections 116 through support column 112 for delivering wind to the ground surface 114. A turbine and generator (not shown) may be located within the base of the support column 112 or, alternatively, positioned adjacently to the base of the support column 112.

On account of the rigid connection between adjacent intake sections 116, this embodiment of the present invention is simpler and less costly to produce as compared to the wind tower 10 of the first embodiment. Nonetheless, wind tower 110 represents an improvement over existing wind towers on account of the plurality of inlets, passageways and outlets in each intake section 116 as discussed above in relation to wind tower 10.

Figure 7:
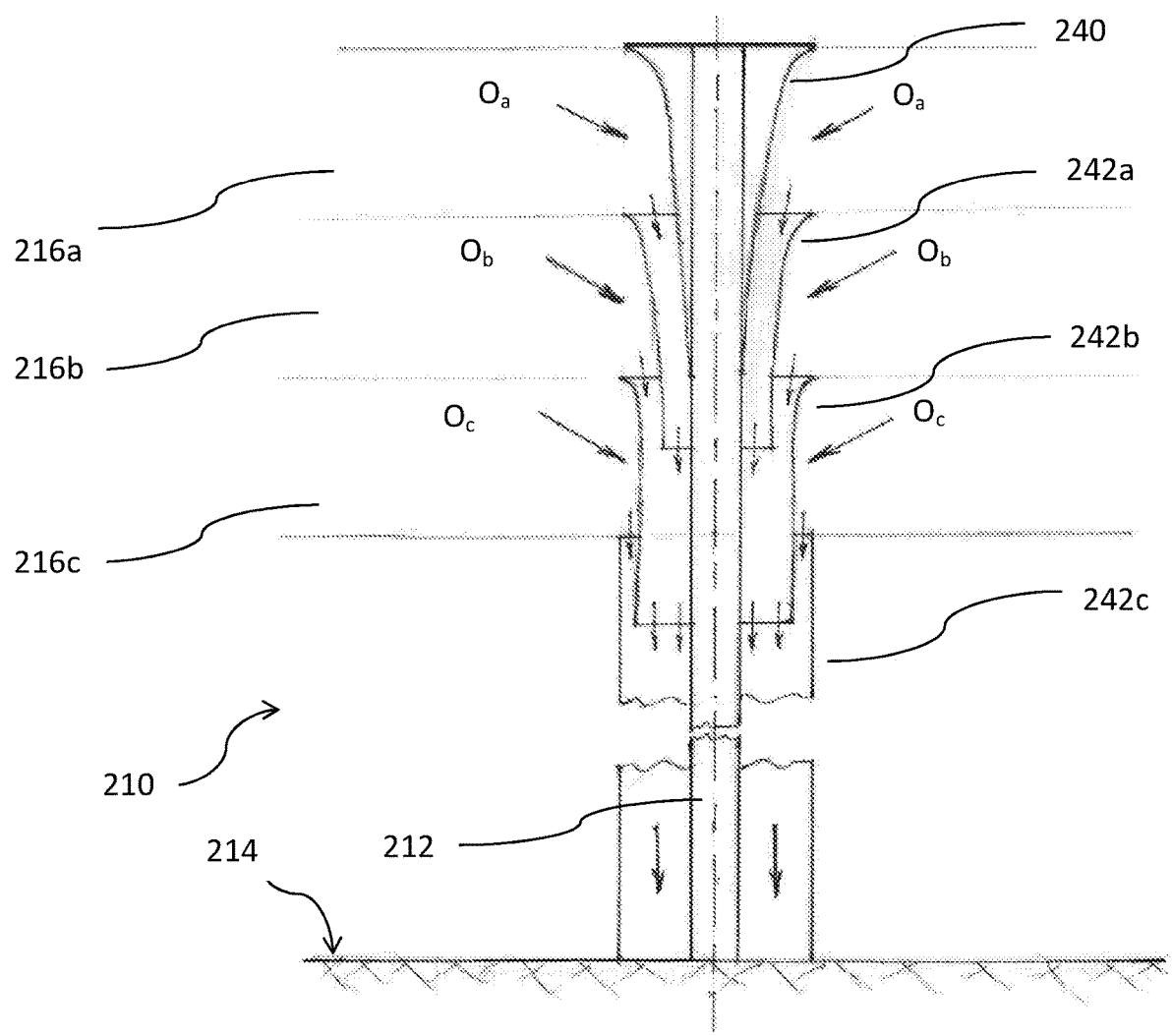
FIG. 7 is a cross sectional perspective of a second and alternative downpipe arrangement to the downpipe arrangement illustrated in FIGS. 3, 4 and 5.

Turning now to FIG. 7, there is illustrated a cross sectional view of a three-tiered wind tower 210 in which an internal downpipe arrangement is shown. For simplicity, this figure has been limited to a three-tiered wind tower however it is to be appreciated that this arrangement could apply to a wind tower having any number of intake sections including wind tower 10 or wind tower 110 as illustrated in the above-described first and second embodiments of the present invention.

FIG. 7 provides a cross sectional view of wind tower 210 which includes three intake sections 216 mounted to a support structure comprising an upright support column 212 mounted to (and extending upwardly from) a support surface comprising ground surface 214. The three intake sections will herein be referred to as an upper intake section 216a, a middle intake section 216b and a lower intake section 216c. Upper intake section 216a, middle intake section 216b and lower intake section 216c deliver respective wind outputs output Oa, Ob and Oc through respective outlets within each intake section 216 (not shown). The three intake sections are supported by support column 212 and by the third downpipe 242c. In this regard, the third downpipe 242c has a dual function as a downpipe and as a support member. The three intake sections 216a, 216b 216c are rigidly connected to one another and rotatably mounted with respect to the support column 212 and the third downpipe 242c by virtue of lower intake section 216c riding on a circular rail (not shown) atop third downpipe 242c.

Wind tower 210 includes a conical funnel member 240 located within upper intake section 216a which surrounds the support column 212 and operates to direct the wind output Oa downwardly toward the ground surface 214. A first downpipe 242a extends downwardly from the upper intake section 216a and defines a passageway for wind output Oa to be delivered downward. A second downpipe 242b extends downwardly from the middle intake section 216b and defines a passageway for the wind output Ob to be delivered downward. A third downpipe 242c extends downwardly from the lower intake section 216c and defines a passageway for wind output Oc to be delivered downward. As illustrated in FIG. 7, the first downpipe 242a is arranged to deliver output Oa into the mouth of the second downpipe 242b. In this regard, the flow through the second downpipe 242b comprises the flow output Oa from the upper intake section 216a as well as the output Ob from the middle intake section 216b. The output of the second downpipe 242b is arranged within the mouth of the third downpipe 242c such that the flow from the second downpipe (i.e. outputs Oa and Ob) meet the output Oc in the third downpipe 242c. In this regard, the outputs of all three intake sections Oa, Ob, Oc are delivered through the third downpipe toward the ground surface 214. Whilst wind tower 210 is a three tiered wind tower alternative to the twenty-six-tiered wind tower 110 illustrated in FIG. 6, it will be appreciated that the downpipe arrangement shown in FIG. 7 could be utilised in the wind tower 110. In this instance, the support column 112 illustrated in FIG. 6 would correspond to the third downpipe 242c illustrated in FIG. 7.

In the above-described configuration shown in FIG. 7, intake sections 216c, 216b and 216a are permitted to rotate (by virtue of the circular rail atop third downpipe 242c) with respect to support column 212 and third downpipe 242c. Conical funnel member 240, first downpipe 242a and second downpipe 242b are rigidly connected to the upper, middle and lower intake sections 216a, 216b 216c respectively such that the conical funnel member 240, first downpipe 242a and second downpipe 242b are also permitted to rotate with respect to the support column 212 and the third downpipe 242c. In other words, the second downpipe 242b will be permitted to rotate within third downpipe 242c which is static relative to the ground surface 214.

In an alternative arrangement (not illustrated) an additional three circular rails are included in addition to the circular rail atop third downpipe. In this alternative, a circular rail is also included atop each of the conical funnel member, the first downpipe and the second downpipe. In this alternative configuration, the first, second and third downpipes and the conical funnel member are rigidly connected to each other. Accordingly, the three downpipes and the conical support member will be fixed relative to the ground surface whilst the three intake sections will be fixed together and permitted to rotate relative to the three downpipes, the conical support, the support member and the ground surface. The conical funnel member may also be rigidly connected to support column. A total of four circular rails are therefore provided at the interfaces between the static components (the three downpipes and the conical funnel member) and the rotatable components (the three intake sections).

Figure 8:
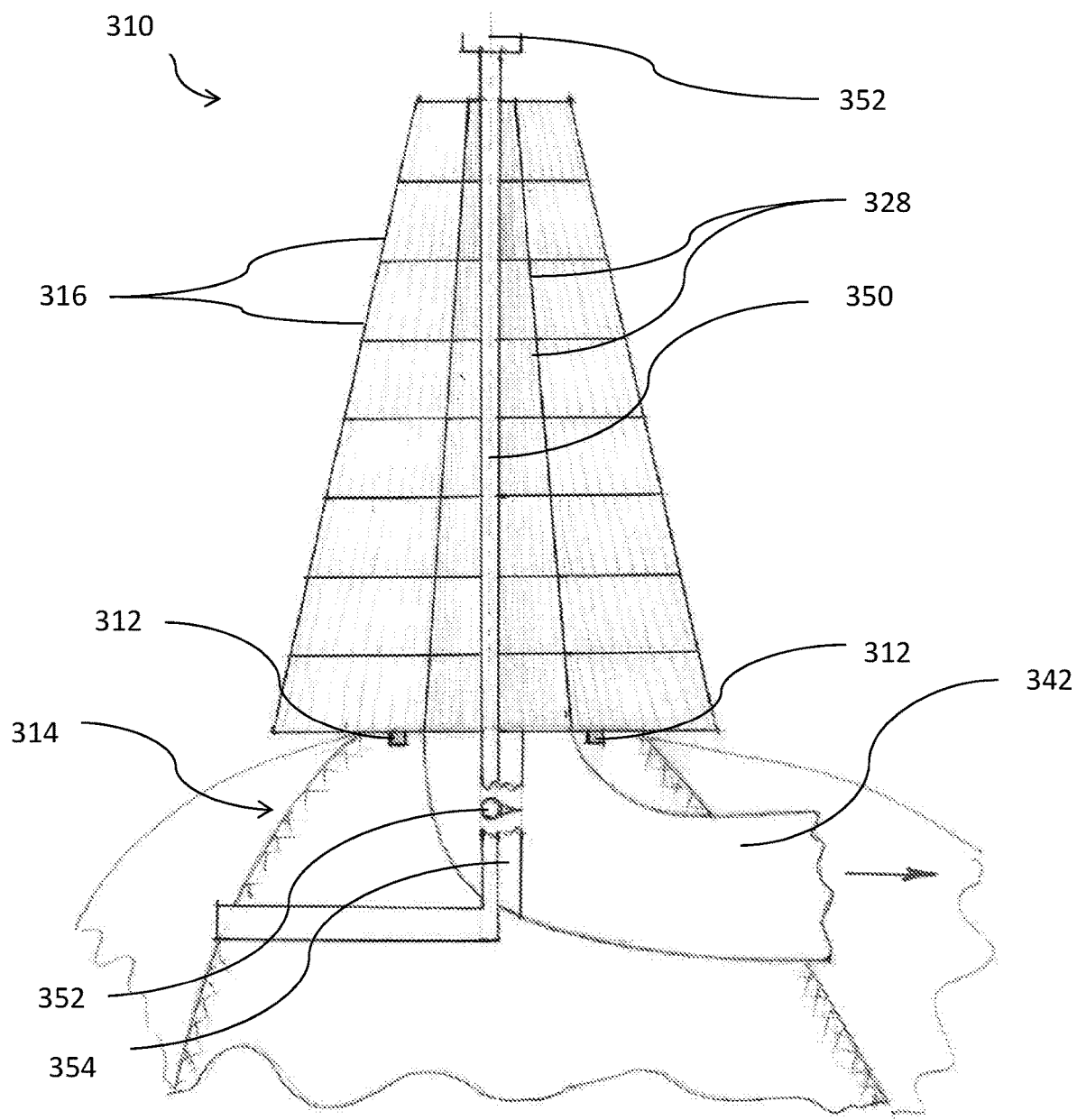
FIG. 8 is a front diagrammatic perspective of a wind tower according to a third embodiment of the present invention

Turning now to FIG. 8, there is illustrated an alternative wind tower 310 in accordance with a third embodiment of the present invention. Wind tower 310 comprises eight intake sections 316 rigidly connected together and rotatably mounted to a support structure which comprises a circular rail 312. Circular rail 312 is rigidly mounted to a support surface comprising a hilltop 314. The lowermost of the intake sections 316 is rotatably mounted to the circular rail 312 via a concave wheel arrangement (not shown) connected to the underside of the lowermost intake section 316 and thereby facilitating the lowermost intake section 316 to roll around the circular rail 312 and permitting rotation of the lowermost intake section 316 (and the seven additional tiers of intake sections 316 connected rigidly thereto) about a central, vertical axis.

Intake sections 316 are equivalent to the intake section 16 illustrated in FIGS. 2, 3 4, with the exception that intake sections 316 are rigidly connected to each other and do not include the downpipe arrangement illustrated in respect of Wind tower 10. In contrast, wind tower 310 includes an output passage comprised of the collective central apertures 328 in each intake section 316. In other words, the wind output of each intake section 316 feeds directly into the central apertures 328 which widen toward the base of wind tower 310 in correlation to the increasing size of intake sections 316. Beneath the lowermost of the intake sections 316 is a single outlet pipe 342 which extends through the hilltop 314 toward a nearby and adjacent turbine and electric generator arrangement (not shown).

Wind tower 310 further includes a maintenance passage 350 which extends through each of the central apertures 328 and facilitates maintenance access to each of the intake sections 316. Furthermore, maintenance passage 350 provides access to the wind tower summit 352 where it may be desirable for radio or satellite to be installed in view of the relatively high altitude. As illustrated in FIG. 8, a portion of the maintenance passage 350 extends through outlet 342. For the reduction of aerodynamic drag in the outlet pipe 342, maintenance passage 350 is provided with a tail 354 creating a streamlined profile 352 (shown in partial top view).

As noted above, the intake face 36 is generally curvilinear. However, In alternative embodiments of the invention, the intake face may be generally planar. In such examples, the rounded leading edges 48 of the intake partitions are generally aligned on a common plane. In a further alternative the intake face could be arranged in a 'V' configuration.

In addition to the present invention facilitating the passage of wind from higher altitudes to a ground based turbine/generator, it will be appreciated that a degree of downward air flow through the wind tower may occur even when there is light or no wind flow, due to reverse chimney effect (i.e. cool air dropping downward through the downpipes toward the ground). In this regard, some embodiments of the present invention may permit the thermal energy differential between the ground and the elevated intake section to be utilised to generate power, irrespective of the intake wind velocity at the intake sections.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The claims defining the invention are as follows:

1. A wind tower for delivering wind flow to a turbine comprising:
   a support structure mounted to a support surface;
   a stackable wind intake section rotatably mounted to the support structure and elevated with respect to the support surface, the stackable wind intake section comprising:
      a central aperture;
      a plurality of internal passageways separated by a plurality of internal partitions and extending between a plurality of wind-facing inlets oriented for concurrently receiving an incoming wind-flow across a width of the stackable wind intake section and a plurality of outlets, each of the plurality of wind-facing inlets being in fluid communication with one of the plurality of outlets and the plurality of outlets being distributed around and in fluid communication with the central aperture, wherein the central aperture is of lesser diameter than a total width of the plurality of wind-facing inlets to concentrate wind flow captured across a wider area via one of the plurality of internal passageways wherein all of the plurality of wind-facing inlets in the stackable wind intake section are orientated for concurrently receiving an oncoming wind-flow; and
   an output passageway for collecting wind flow from the plurality of outlets, the output passageway being in fluid communication with the plurality of outlets and extending downwardly from the stackable wind intake section toward the support surface for delivering wind flow to a turbine located at or proximate to the support surface.

2. The wind tower according to claim 1, wherein the central aperture is circular and the plurality of outlets being distributed circumferentially around the central aperture.

3. The wind tower according to claim 1, wherein the stackable wind intake section comprises a wind-facing intake face on which the plurality of wind-facing inlets are disposed and an outlet face on which the plurality of outlets are disposed, the plurality of internal partitions extending between the wind-facing intake face and the outlet face.

4. The wind tower according to claim 3, wherein the wind-facing intake face is square when viewed from a front perspective.

5. The wind tower according to claim 3, wherein the wind-facing intake face is rectangular.

6. The wind tower according to claim 3, wherein the wind-facing intake face is curvilinear.

7. The wind tower according to claim 3, wherein the outlet face is annular defined by the central aperture.

8. The wind tower according to claim 3, wherein the wind-facing intake face comprises a leading edge portion and wherein the wind-facing inlets are located, in use, downwind of the leading edge portion.

9. The wind tower according to claim 3, wherein the wind-facing intake face has a generally sinusoidal profile.

10. The wind tower according to claim 3, wherein the wind-facing intake face has a horse-shoe profile.

11. The wind tower according to claim 3, wherein the wind-facing intake face has a semi-circular profile.

12. The wind tower according to claim 1, wherein one of the plurality of internal passageways comprises a generally linear portion and a curved portion.

* * * * *